(12) United States Patent
Venkatadri

(10) Patent No.: US 11,604,908 B2
(45) Date of Patent: *Mar. 14, 2023

(54) HARDWARE IN LOOP TESTING AND GENERATION OF LATENCY PROFILES FOR USE IN SIMULATION

(71) Applicant: UATC, LLC, Mountain View, CA (US)

(72) Inventor: Arun Dravid Kain Venkatadri, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,349

(22) Filed: Nov. 8, 2021

(65) Prior Publication Data

US 2022/0058314 A1 Feb. 24, 2022

Related U.S. Application Data

(63) Continuation of application No. 16/594,876, filed on Oct. 7, 2019, now Pat. No. 11,194,939.

(Continued)

(51) Int. Cl.
*G06F 9/45* (2006.01)
*G06F 30/20* (2020.01)
*G06F 9/455* (2018.01)
*G06F 9/445* (2018.01)
*G06F 16/23* (2019.01)

(Continued)

(52) U.S. Cl.
CPC .......... *G06F 30/20* (2020.01); *G05D 1/0088* (2013.01); *G06F 9/445* (2013.01); *G06F 9/45508* (2013.01); *G06F 16/2379* (2019.01); *G06N 3/006* (2013.01); *G06N 5/04* (2013.01); *G05D 2201/0213* (2013.01); *G06F 2111/08* (2020.01); *G06N 20/00* (2019.01); *H04W 4/44* (2018.02)

(58) Field of Classification Search
None
See application file for complete search history.

(56) References Cited

U.S. PATENT DOCUMENTS

2018/0141562 A1* 5/2018 Singhal .................. G08G 1/166
2019/0182136 A1* 6/2019 Tamm ..................... H04L 41/40
(Continued)

*Primary Examiner* — Craig C Dorais
(74) *Attorney, Agent, or Firm* — Dority & Manning, P.A.

(57) ABSTRACT

Systems, methods, tangible non-transitory computer-readable media, and devices associated with testing, simulation, or operation of an autonomous device including an autonomous vehicle are provided. For example, a service entity computing system can perform operations including obtaining operating software data associated with operating software of the autonomous vehicle. Log data associated with one or more real-world scenarios can also be obtained. One or more first simulations of the operating software can be performed based on the one or more real-world scenarios. A latency distribution profile associated with the operating software can be generated based on the one or more first simulations. One or more second simulations of the operating software can be performed based on the latency distribution profile and one or more artificially generated scenarios. Furthermore, a real-world behavior of the autonomous vehicle can be predicted based on the one or more second simulations.

20 Claims, 7 Drawing Sheets

Related U.S. Application Data

(60) Provisional application No. 62/888,034, filed on Aug. 16, 2019.

(51) Int. Cl.
*G06N 3/006* (2023.01)
*G05D 1/00* (2006.01)
*G06N 5/04* (2023.01)
G06N 20/00 (2019.01)
H04W 4/44 (2018.01)
G06F 111/08 (2020.01)

(56) References Cited

U.S. PATENT DOCUMENTS

2019/0243371 A1   8/2019  Nister et al.
2019/0268402 A1*  8/2019  Kallakuri ............... H04L 67/289

* cited by examiner

| FUNCTION: | TOTAL LATENCY: | |
|---|---|---|
| Stop Sign Latency | 175 ms | |
| SUB-FUNCTIONS: | LATENCY: | COMPONENT: |
| Camera | 100 ms | Camera Sensor |
| Computer Vision (ML) | 25 ms | Perception System |
| Prediction | 25 ms | Prediction System |
| Motion Planning | 25 ms | Motion Planning System |

FIG. 4

HARDWARE IN LOOP TESTING AND GENERATION OF LATENCY PROFILES FOR USE IN SIMULATION

RELATED APPLICATION

The present application is a continuation of U.S. application Ser. No. 16/594,876 filed on Oct. 7, 2019, which claims priority to U.S. Provisional Patent Application No. 62/888,034 having a filing date of Aug. 16, 2019 both of which are incorporated by reference herein.

FIELD

The present disclosure relates generally to testing of hardware and software including the generation of latency profiles that are used to improve the operation of autonomous devices including autonomous vehicles.

BACKGROUND

Vehicles, including autonomous vehicles, can receive data that is used to determine the state of objects in an environment through which the vehicle travels. Further, the vehicles include internal states that can change the way in which the vehicle operates as well as the way in which the vehicle detects and processes the surrounding environment. As the state of the vehicle and objects in the environment is dynamic, effective operation of a vehicle may involve determination of the vehicle's state and the state of this changing environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of predicting a behavior of an autonomous device and/or operating a computing system associated with an autonomous device including an autonomous vehicle. The computer-implemented method can include obtaining, by a computing system including one or more computing devices, operating software data associated with operating software of the autonomous vehicle. The computer-implemented method can also include obtaining, by the computing system, log data associated with one or more real-world scenarios. The computer-implemented method can include performing, by the computing system, one or more first simulations of the operating software based at least in part on the one or more real-world scenarios. The computer-implemented method can include generating, by the computing system, a latency distribution profile associated with the operating software based at least in part on the one or more first simulations. The computer-implemented method can include performing, by the computing system, one or more second simulations of the operating software based at least in part on the latency distribution profile and one or more artificially generated scenarios. Furthermore, the computer-implemented method can include determining, by the computing system, a predicted behavior of the autonomous vehicle based at least in part on the one or more second simulations.

Another example aspect of the present disclosure is directed to a computing device including: one or more processors; a memory including one or more computer-readable media, the memory storing computer-readable instructions that when executed by the one or more processors cause the one or more processors to perform operations. The operations can include obtaining operating software data associated with operating software of the autonomous vehicle. The operations can include obtaining log data associated with one or more real-world scenarios. The operations can include performing one or more first simulations of the operating software based at least in part on the one or more real-world scenarios. The operations can include generating a latency distribution profile associated with the operating software based at least in part on the one or more first simulations. The operations can include performing one or more second simulations of the operating software based at least in part on the latency distribution profile and one or more artificially generated scenarios. Furthermore, the operations can include predicting a real-world behavior of the autonomous vehicle based at least in part on the one or more second simulations.

Another example aspect of the present disclosure is directed to one or more tangible non-transitory computer-readable media storing computer-readable instructions that when executed by one or more processors cause the one or more processors to perform operations. The operations can include obtaining operating software data associated with operating software of an autonomous vehicle. The operations can include obtaining log data associated with one or more real-world scenarios. The operations can include performing one or more first simulations of the operating software based at least in part on the one or more real-world scenarios. The operations can include generating a latency distribution profile associated with the operating software based at least in part on the one or more first simulations. The operations can include performing one or more second simulations of the operating software based at least in part on the latency distribution profile and one or more artificially generated scenarios. Furthermore, the operations can include predicting a real-world behavior of the autonomous vehicle based at least in part on the one or more second simulations.

Other example aspects of the present disclosure are directed to other systems, methods, vehicles, apparatuses, tangible non-transitory computer-readable media, and devices for predicting a behavior of an autonomous device and/or operation of an autonomous device including an autonomous vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 depicts an example latency distribution profile according to example embodiments of the present disclosure;

DETAILED DESCRIPTION

Figure 1:
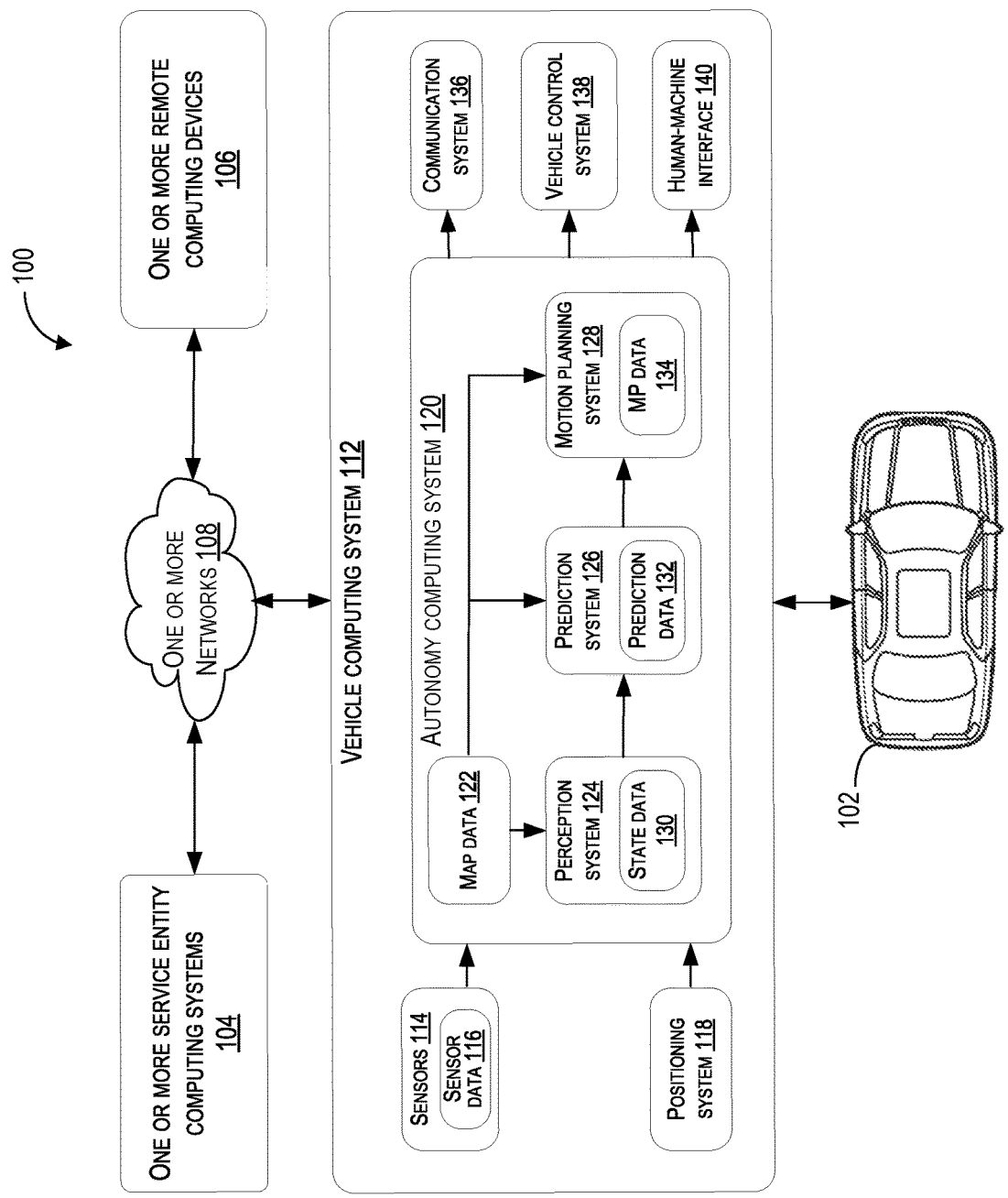
FIG. 1 depicts an example computing system environment according to example embodiments of the present disclosure.

Example aspects of the present disclosure are directed to improving a virtual simulation in order to generate simulation results that better predict real-world behavior. In particular, modifications to operating software of an autonomous vehicle can be analyzed to generate a latency distribution profile that is associated with a vehicle computing system that implements the software. The latency distribution profile can include latency values associated with the latency of various systems or components (e.g., camera sensor, perception system, motion planning system, and/or prediction system) of the vehicle computing system when performing a variety of functions while operating the autonomous vehicle. Further, the latency distribution profile can be provided as an input to a virtual simulation of the autonomous vehicle and can be used to generate a simulation result that predicts a behavior of the autonomous vehicle.

In some embodiments, unique and specialized hardware in loop (HIL) testing can be used to analyze the operating software and generate the latency distribution profile. By generating the latency distribution profile and generating the simulation result based at least in part on the latency distribution profile, the simulation result can more accurately predict the behavior of the autonomous vehicle. Systems and methods consistent with the present disclosure provide ways of efficiently generating a latency distribution profile for operating software of an autonomous vehicle, and generating a simulation result based at least in part on the latency distribution profile. In this way, the systems and methods can improve the virtual simulation of the autonomous vehicle. Additionally, the systems and methods can provide ways of storing multiple simulation results corresponding to the autonomous vehicle running different versions of the operating software. Furthermore, the simulation results can be stored in a structured data format that can be used to help identify patterns, trends, and/or the like across the different versions of the operating software based at least in part on the corresponding behavior of the autonomous vehicle.

By way of example, a service entity that provides services related to autonomous vehicles can modify operating software of an autonomous vehicle by adjusting parameters, adding features, increasing efficiency, and/or the like. The service entity can test the modified operating software in a virtual simulation that involves an emulated vehicle computing system responding to a virtual scenario. If there is a discrepancy between the simulation result and a real-world behavior of an autonomous vehicle running the modified operating software (e.g., during closed-track testing and/or open-road testing), then further testing may be needed to identify a cause of the discrepancy and to verify the safety and integrity of the modifications to the operating software. In some cases, a relatively minor discrepancy (e.g., a 1% difference between a simulated result and a real-world behavior) can require an extensive amount of further testing (e.g., approximately one billion additional miles driven) to identify the cause and verify the operating software. Accordingly, by enabling the service entity to generate a simulation result that more accurately predicts a real-world behavior of the autonomous vehicle, a probability of a discrepancy between the simulated result and the real-world behavior can be lowered, thereby reducing the time needed to test the operating software and lowering the development cost associated with rolling out newer versions of the operating software.

The operating software can include any software that is associated with the autonomous vehicle. Further, the operating software can include any computer software that is used to: communicate (e.g., send and/or receive) data and/or information with any software system, hardware component, and/or hardware system of the autonomous vehicle; operate and/or control any software or component of the autonomous vehicle including hardware and/or software components. For example, the operating software can include software used to operate: an autonomy computing system of the autonomous vehicle including a perception computing system, a prediction computing system, and/or a motion planning system; a sensor system of the autonomous vehicle; and/or a communications system of the autonomous vehicle.

According to aspects of the present disclosure, the service entity (e.g., a service entity computing system) can obtain operating software data associated with operating software of an autonomous vehicle. The data can include a version of the operating software that can be executed by a vehicle computing system onboard an autonomous vehicle. The vehicle computing system can execute the operating software in order to operate the autonomous vehicle (e.g., to provide a vehicle service). In some embodiments, the data can include information associated with a difference between a current (e.g., modified) version of the operating software and a prior version of the operating software. The information associated with the difference can include an indication of one or more modifications that were made to the prior version of the operating software to generate the current version of the operating software.

According to aspects of the present disclosure, the service entity can obtain log data associated with one or more real-world scenarios. The log data can include, for example, sensor data obtained from an autonomous vehicle operating in a real-world environment. For example, an autonomous vehicle that is selected to provide a vehicle service from a starting location to an ending location can collect and store sensor data indicative of an environment of the autonomous vehicle as it is providing the service. The sensor data that corresponds to the vehicle service from the starting location to the ending location, or a selected portion thereof, can represent a real-world scenario.

According to aspects of the present disclosure, the service entity can perform one or more first simulations of the operating software based at least in part on the one or more real-world scenarios. For example, the service entity can initialize a vehicle computing system to an initial state, and execute the operating software on the initialized vehicle computing system. The vehicle computing system can be initialized by modifying a state of the vehicle computing system to a set of initial or default settings. The service entity can perform each first simulation based on a different real-world scenario in the log data to determine a latency value associated with one or more components (e.g., camera latency, computer vision latency, motion planning latency, and/or prediction latency) of the vehicle computing system when the vehicle computing system performs one or more functions (e.g., stop at a stop sign) in response to the real-world scenario.

In some embodiments, the latency value can be associated with the latency of one or functions, one or more operations, one or more components, and/or one or more systems. Further, the latency value can include an amount of time between a set of signals (e.g., electronic signals) or instructions (e.g., computer-readable instructions) being sent to a component and/or system and some action or event being initiated by the respective component and/or system in response to receiving the set of signals or instructions.

In some embodiments, the latency value can be associated with a delay that can include an amount of time between: sending an instruction for a system or component to perform a function or operation and the function or operation being performed by the system or component; sending a signal to a component or system and the respective component or system receiving the signal and initiating an action based on receiving the signal; sending a request for data to a component or system and the component or system receiving the request for data; and/or sending a request for data to a component or system and receiving a response to the request for data from the component or system.

The service entity can generate a latency distribution profile for the operating software based at least in part on the simulation result of each first simulation by aggregating the latency values on a per function and per component basis to determine a distribution of latency values for each component of each of function. The latency distribution profile can include a distribution of one or more latency values associated with one or more components of the vehicle computing system when performing one or more functions in response to the one or more real-world scenarios. In some embodiments, the vehicle computing system used to perform the one or more first simulations can include physical electronics and/or mechanical components similar to the hardware/software used to operate an autonomous vehicle. For example, a vehicle computing system can include a modular design that enables it to be removed from (and reinserted into) an autonomous vehicle. The modular vehicle computing system can be configured to interface with the service computing system to be used for performing simulations. In some embodiments, the service entity can simulate one or more components of the vehicle computing system when performing the one or more first simulations. For example, one or more components of the vehicle computing system may be affixed or integrated with an autonomous vehicle, and these components can be excluded from the modular design. Instead, the one or more first simulations can include a virtual representation of the excluded components.

According to aspects of the present disclosure, the service entity can obtain bench test data associated with one or more latency values associated with one or more components that are not included in the vehicle computing system, and the service entity can generate the latency distribution profile based at least in part on the one or more first simulations and the bench test data. For example, if a camera sensor component used in an older model of an autonomous vehicle has been upgraded to a different sensor in a newer model, then using a vehicle computing system corresponding to the older model of the autonomous vehicle for the one or more first simulations may not provide an accurate latency distribution for the camera sensor component. In this case, the service entity can obtain bench test data associated with a latency distribution of the camera sensor component in the newer model of the autonomous vehicle, and the service entity can incorporate the bench test data when generating the latency distribution profile associated with the operating software.

In some embodiments, the bench test data can be used to determine software failure rates (e.g., the rate at which various software applications and/or versions of software fail) and/or hardware failure rates (e.g., the rate at which components and/or systems fail). The software failure rates and/or hardware failure rates can be used in one or more simulations (e.g., the one or more first simulations and/or the one or more second simulations) and/or actuarial calculations. For example, the bench test data can include the rate at which a sensor component fails, which can be used as part of a simulation that includes a system that uses the sensor component. Further, the bench test data can include the rate at which a particular version of an operating system for an autonomous vehicle fails, which can be used as part of a simulation of an autonomous vehicle that uses that version of the operating system. By way of further example, bench test data that includes the rates at which various sensor components fail can be used to determine the risks and costs associated with each of the respective sensor components failing.

According to aspects of the present disclosure, the service entity can perform one or more second simulations of the operating software based at least in part on the latency distribution profile. For example, the service entity can initialize a virtual vehicle computing system (e.g., a vehicle computing system emulator), and execute the operating software on the initialized virtual vehicle computing system. The service entity can perform each second simulation based on a different virtual scenario to generate a simulation result. A virtual scenario can be based at least in part on a real-world scenario and/or an artificially-generated scenario. In some embodiments, each second simulation can include determining, based on a simulated autonomous vehicle running the operating software, one or more functions that the virtual vehicle computing system performs in response to a virtual scenario; and determining, based on the latency distribution profile, a latency value associated with one or more components of each function. The service entity can aggregate a simulation result of each second simulation to generate simulation results associated with the operating software. In some embodiments, a second simulation can include determining, based on the latency distribution profile, several latency values associated with a component of a function, and the service entity can generate several corresponding simulation results associated with the simulation (e.g., a simulation result for each of the latency values). The simulation results can indicate a predicted behavior of an autonomous vehicle operating in the real-world in response to a real-world equivalent of the virtual scenario when the autonomous vehicle is running the operating software associated with the simulation results. In some embodiments, the service entity can provide data associated with the simulation results (e.g., raw output data of the one or more second simulations and/or one or more predicted behaviors of the autonomous vehicle) to one or more remote computing systems.

According to aspects of the present disclosure, the service entity can store each simulation result in a structured data format. For example, the service entity can store the simulation results in a way that can create an association across multiple versions of the operating software. In some embodiments, the service entity can analyze the simulation results in the structured data format to identify patterns, trends, and/or the like between different versions of the operating software based on the corresponding predicted behavior of the autonomous vehicle. In some embodiments, the service entity can provide data associated with the structured data format and/or an analysis of the simulation results to one or more remote computing systems. In some embodiments, analysis of the simulation results can include one or more comparisons of one or more differences in simulation results from different versions of the operating software.

More particularly, a service entity can operate, maintain, manage, and/or control a vehicle service platform (e.g., via a service entity computing system) that coordinates the provision of vehicle services (e.g., transportation services) for vehicles (e.g., ground-based vehicles including automobiles, cycles, and/or trucks; aircraft including vertical take-off and landing aircraft; and/or boats) that operate on the vehicle service platform as part of one or more separate fleets. The service entity can also develop, operate, maintain, manage, and/or control a fleet of one or more autonomous vehicles operating on the vehicle service platform, and/or related technologies (e.g., via the service entity computing system). The service entity computing system can include various systems and devices configured to develop, test, and rollout successive versions of operating software for autonomous vehicles operating on the vehicle service platform.

An autonomous vehicle (e.g., automobiles, cycles, scooters, aircraft, and/or light electric vehicles) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to determine the vehicle's surrounding environment by performing various processing techniques on the sensor data, and generate an appropriate motion plan to navigate and/or guide the vehicle through the vehicle's surrounding environment. In some embodiments, when the vehicle computing system is interfaced with an autonomous vehicle, the vehicle computing system can communicate with a remote computing system including, for example, the service entity computing system, via a communication system onboard the vehicle. Alternatively, when the vehicle computing system is interfaced with the service entity computing system, the service entity computing system can perform one or more simulations using the vehicle computing system.

The systems, methods, devices, and non-transitory computer-readable media in the disclosed technology can provide a variety of technical effects and benefits. In particular, the disclosed technology can provide technical effects and benefits to the overall operation of an autonomous device and the prediction of the behavior of an autonomous vehicle in particular.

For instance, by generating a latency distribution profile for operating software of an autonomous vehicle, and performing virtual simulations based at least in part on the latency distribution profile, the disclosed technology enables a service entity to generate simulation results that accurately predict a real-world behavior of the autonomous vehicle. This can result in substantially reduced development and testing time, and reduced development cost associated with rolling out newer versions of the operating software. Further, by generating and storing simulation results for multiple versions of the operating software in a structured data format, the simulation results can be analyzed to identify hidden, unintuitive, and/or unintentional correlations across the different versions of the operating software based at least in part on the corresponding behavior of the autonomous vehicle.

Furthermore, the disclosed technology offers the benefits of greater safety by operating within the confines of a simulation. Since the latency of components is tested within the confines of a simulation, any potential adverse outcomes or sub-optimal performance by the one or more components can be identified before having an opportunity to have an adverse effect in the physical world.

Additionally, by simulating different amounts of latency in a variety of components, some of which may be essential, the disclosed technology can facilitate testing of the effects of latency on safe operation of the operating software of a vehicle. As such, a more safe and efficient operating software can be developed through determination of the latency associated with different configurations of components and/or the effects of changes in the operating software on latency.

With reference now to FIGS. 1-7, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an service entity computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The service entity computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The service entity computing system 104 can include multiple components for performing various operations and functions. For example, the service entity computing system 104 can include and/or otherwise be associated with the one or more computing devices that are remote from the vehicle 108. The one or more computing devices of the service entity computing system 104 can include one or more processors and one or more memory devices. The one or more memory devices of the service entity computing system 104 can store instructions that when executed by the one or more processors cause the one or more processors to perform one or more operations and/or functions associated with operation of a vehicle including any of the operations described herein. For example, the operations and/or functions performed by the service entity computing system 104 can include predicting a behavior of an autonomous device and/or operating an autonomous device including an autonomous vehicle.

For example, the service entity computing system 104 can be configured to monitor and communicate with the vehicle 108 and/or its users to coordinate a vehicle service provided by the vehicle 108. To do so, the service entity computing system 104 can manage a database that includes data including operating software data associated with operating software of an autonomous vehicle, log data, and/or state data associated with the state of one or more objects including one or more objects external to the vehicle 108. The state data can include a location of an object (e.g., a latitude and longitude of an object detected by the one or more sensors 114 of the vehicle 108), the state of a vehicle (e.g., the velocity, acceleration, and/or location of the vehicle 108), or the state of objects external to a vehicle (e.g., the physical dimensions, velocity, acceleration, heading, location, position, shape, and/or appearance of one or more objects external to the vehicle).

The service entity computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the service entity computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the service entity computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based in part on signals or data exchanged with the vehicle 108. In some embodiments, the service entity computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the service entity computing system 104, which can store an indication, record, and/or other data indicative of the state of the one or more objects within a predefined distance of the vehicle 108 in one or more memory devices associated with the service entity computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the service entity computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class, pedestrian class vs. bicycle class, and/or vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the service entity computing system 104 and/or one or more other remote computing devices (e.g., the one or more remote computing devices 106) over one or more networks (e.g., via one or more wireless signal connections). In some embodiments, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some embodiments, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
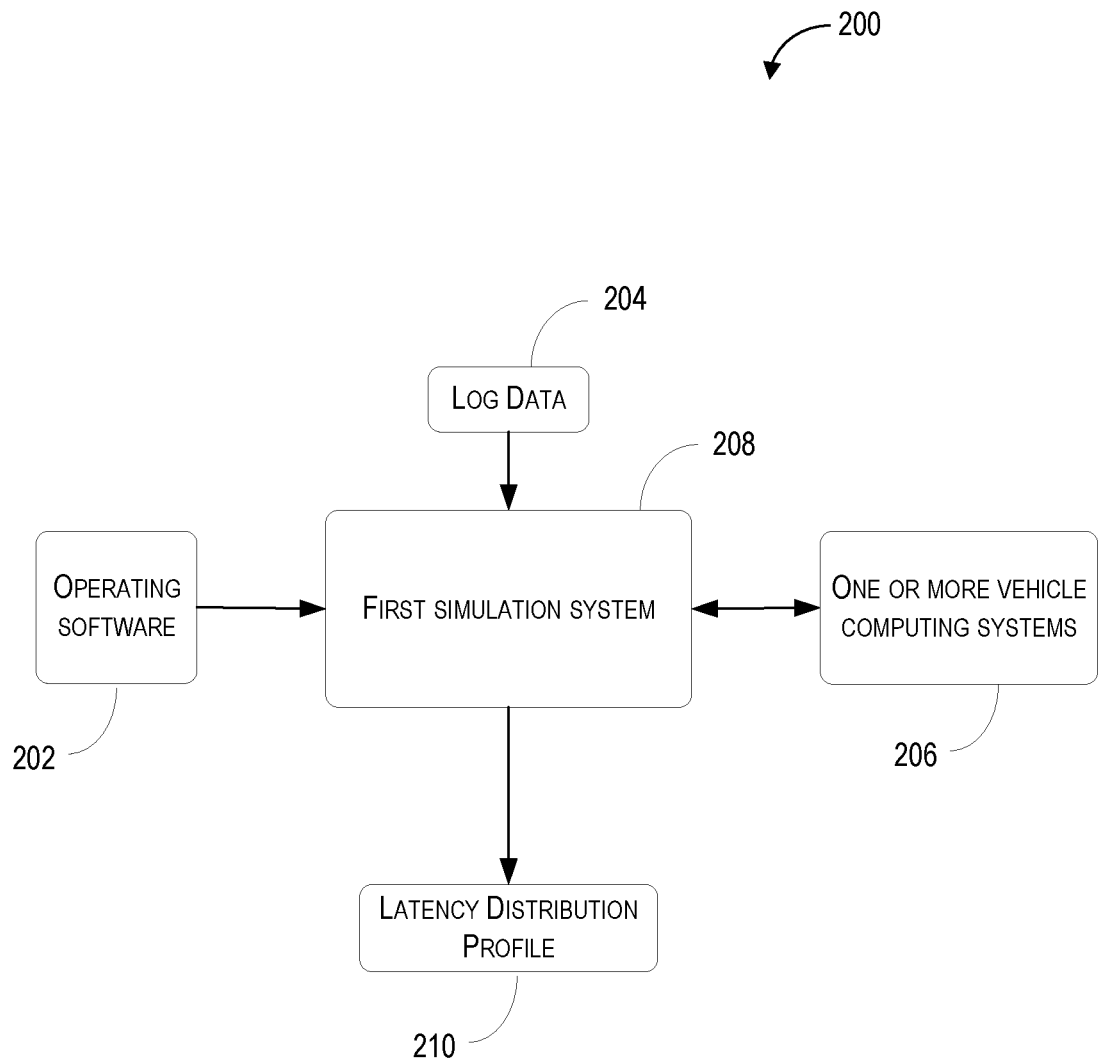
FIG. 2 depicts an example of performing simulations based at least in part on real-world scenarios according to example embodiments of the present disclosure.

FIG. 2 depicts an example of performing simulations based at least in part on real-world scenarios according to example embodiments of the present disclosure. One or more operations and/or functions or operations in FIG. 2 can be implemented and/or performed by one or more devices (e.g., one or more computing devices) or systems including, for example, the service entity computing system 104, the vehicle 108, or the vehicle computing system 112, which are shown in FIG. 1. Further, the one or more devices and/or systems in FIG. 2 can include one or more features of one or more devices and/or systems including, for example, the service entity computing system 104, the vehicle 108, or the vehicle computing system 112, which are depicted in FIG. 1.

As illustrated, FIG. 2 shows an example of a computing system 200 (e.g., a service entity computing system) that includes operating software data 202, log data 204, one or more vehicle computing systems 206, first simulation system 208, and a latency distribution profile 210.

The operating software data 202 can include information and/or one or more sets of instructions that are used to operate and/or control one or more systems and/or components including any system and/or component associated with a vehicle. Further, the operating software data 202 can include information associated with the version of the operating software data 202, an operating system associated with the operating software data 202, and/or a change log including a record of modifications (e.g., software updates) to the operating software data 202. The change log associated with the operating software data 202 can indicate the types of modifications that were implemented on the operating software data 202 and the date and/or time at which each modification was implemented. In some embodiments, the operating software data 202 can be provided as an input to one or more computing systems including the first simulation system 208. Further, the information, data, and/or one or more sets of instructions included in the operating software data 202 can be implemented, performed, and/or executed on one or more computing systems including the first simulation system 208.

The log data 204 can include information and/or data associated with one or more real-world scenarios. The one or more real-world scenarios can include information and/or data associated with one or more devices (e.g., an autonomous vehicle including the autonomous vehicle's various systems and components) including: the identity of the one or more devices (e.g., the make and model of a camera component and/or the version of the software associated with the camera component); one or more states of the one or more devices and an associated date and/or time at which the one or more states were recorded (e.g., the operational state of a camera component including the times at which the camera was recording); and/or information and/or data captured by the one or more devices (e.g., images captured by a camera component). In some embodiments, the log data 204 can be provided as an input to one or more computing systems including the first simulation system 208.

In some embodiments, the log data 204 can be based at least in part on information and/or data gathered from a vehicle component or system that is configured to have its state recorded as it operates. Further, the log data 204 can be based at least in part on: information and/or data provided by internal computing systems associated with the various systems or components of the one or more devices; and/or information and/or data generated by an external system that monitors the one or more devices. By way of example, the log data 204 can be based at least in part on a monitored vehicle that is monitored by external devices that detect and record the state of the vehicle's components and systems as the vehicle is operated.

The one or more vehicle computing systems 206 can include one or more computing systems that are configured to operate and/or control one or more vehicle systems or components associated with a vehicle. Further, the one or more vehicle computing systems 206 can include any of the attributes and/or capabilities of the vehicle computing system 112 that is depicted in FIG. 1. The one or more vehicle computing systems 206 can send data to and/or receive data from the first simulation system 208. For example, the one or more vehicle computing systems 206 can generate sensor data associated with a sensor system and send the sensor data to the first simulation system 208. Further, copies of one or more portions of information, data, and/or sets of instructions associated with the one or more vehicle computing systems 206 can be implemented, performed, and/or executed on the first simulation system 208.

The first simulation system 208 can include one or more computing systems that are configured to operate, generate, and/or control one or more simulations including simulations associated with vehicle systems or components of a vehicle. In some embodiments, the first simulation system 208 can perform one or more operations associated with emulating any of the functions and/or operations performed using the operating software data 202 and/or the one or more vehicle computing systems 206. Further, the first simulation system 208 can include any of the attributes and/or capabilities of the service entity computing system 104 that is depicted in FIG. 1. The first simulation system 208 can be configured to: receive the operating software data 202; receive the log data 204; send data to and/or receive data from the one or more vehicle computing systems 206; and/or perform one or more operations including executing sets of instructions based at least in part on one or more portions of information, data, and/or sets of instructions associated with the operating software data 202, the log data 204, and/or the one or more vehicle computing systems 206.

For example, the first simulation system 208 can receive the operating software data 202, which can include a copy of operating software that is used to perform operations including operating the autonomy system of an autonomous vehicle. Further, the first simulation system 208 can receive the log data 204, which includes information and/or data associated with one or more real-world scenarios including a set of operations performed by actual systems of a physical vehicle that operates in the real world. The first simulation system 208 can also receive information, data, and/or sets of instructions associated with the one or more vehicle computing systems 206, which can be used to simulate the operation of one or more components and/or systems (e.g., hardware and/or software systems) of a vehicle or other device. Using one or more portions of the operating software data 202, the log data 204, and/or data associated with the one or more vehicle computing systems 206, the first simulation system 208 can then perform one or more operations to simulate the operation of the autonomy system associated with the operating software data 202 and the systems and/or components associated with the one or more vehicle computing systems 206.

By way of further example, the first simulation system 208 can receive the log data 204 which can be associated with the operation of a perception system of an autonomous vehicle and can include information associated with detection of an environment by a sensor (e.g., LiDAR sweeps) of the autonomous vehicle as the vehicle travels through the environment. The first simulation system 208 can then generate a simulation of the operation of an autonomous vehicle (e.g., an autonomous vehicle that includes a sensor system) using information, data, and/or sets of instructions received from the operating software data 202 (e.g., information associated with an autonomy system), the log data 204, and/or the one or more vehicle computing systems 206 (e.g., information associated with the systems and components that operate the perception system of an autonomous vehicle). The first simulation system 208 can be configured to collect and/or record information and/or data associated with the simulation including information associated with the timing and/or latency of various systems and/or components that are simulated. In some embodiments, the first simulation system 208 can send information and/or data associated with the simulation to one or more remote computing devices that are configured to communicate with the first simulation system 208. The first simulation system 208 can generate output including information and/or data associated with the simulation including the latency distribution profile 210. Further, the output generated by the first simulation system 208 can be based at least in part on the information, data, and/or sets of instructions received from the operating software data 202, the log data 204, and/or the one or more vehicle computing systems 206.

The latency distribution profile 210 can include information and/or data associated with the latency of systems and/or components simulated by the first simulation system 208. The latency distribution profile 210 can include information and/or data associated with a function and/or operation performed by a simulated system or component along with the corresponding latency (e.g., time delay) associated with performing the function and/or operation. For example, the latency distribution profile 210 can include information and/or data associated with: a red light detection function (e.g., an autonomous vehicle's computing system detecting a red light); the total latency associated with the red light function in milliseconds (e.g., a total latency of ninety milliseconds); and a set of sub-functions and the corresponding component and component latency associated with the sub-function (e.g., the red light function may be associated with a camera component with a latency of fifty milliseconds, a perception system with a latency of ten milliseconds, a prediction system with a latency of ten milliseconds, and a motion planning system with a latency of twenty milliseconds).

Figure 3:
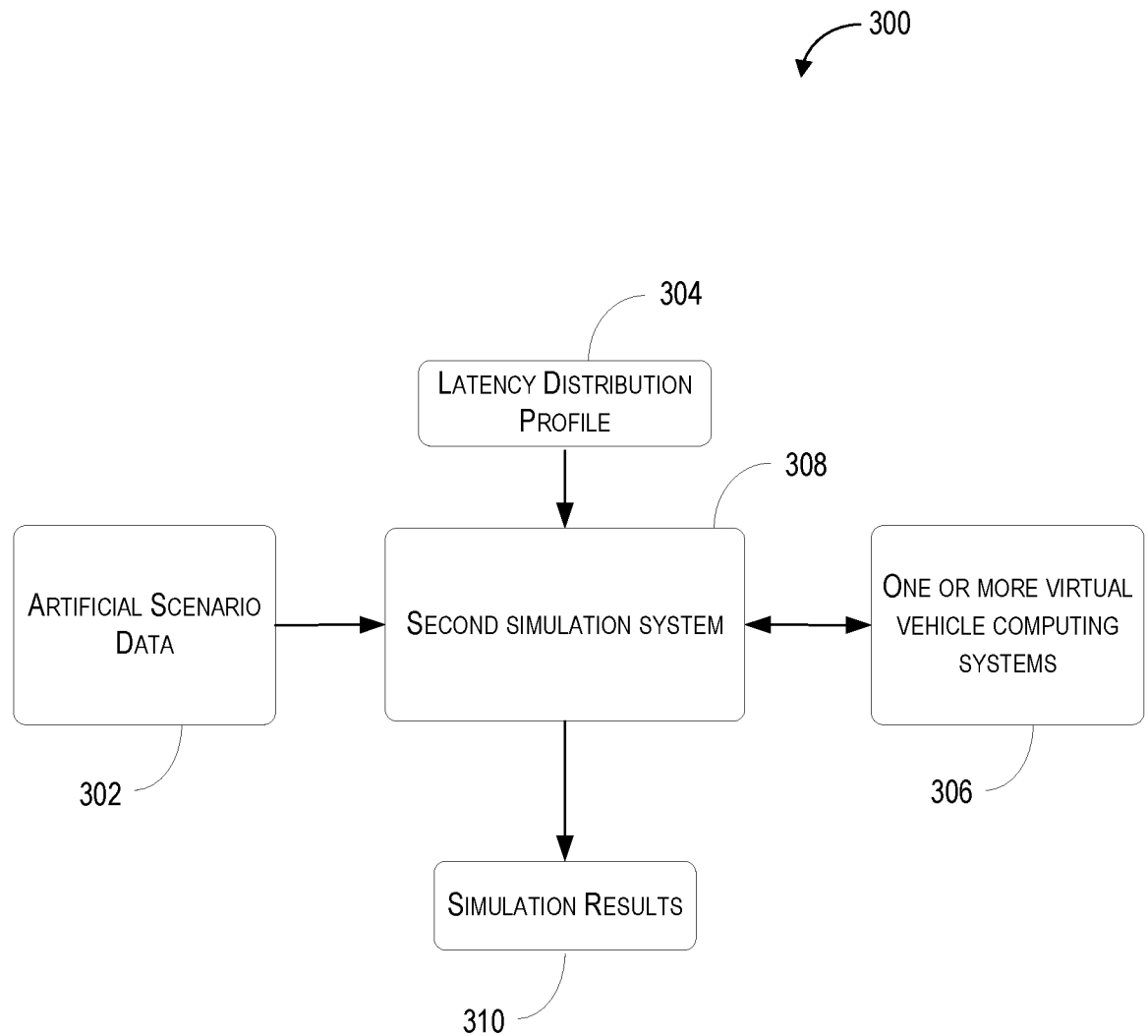
FIG. 3 depicts an example of performing simulations based at least in part on a latency distribution profile according to example embodiments of the present disclosure.

FIG. 3 depicts an example of performing simulations based at least in part on a latency distribution profile according to example embodiments of the present disclosure. One or more operations and/or functions in FIG. 3 can be implemented and/or performed by one or more devices (e.g., one or more computing devices) or systems including, for example, the service entity computing system 104, the vehicle 108, or the vehicle computing system 112, which are shown in FIG. 1. Further, the one or more devices and/or systems in FIG. 3 can include one or more features of one or more devices and/or systems including, for example, the service entity computing system 104, the vehicle 108, or the vehicle computing system 112, which are depicted in FIG. 1.

As illustrated, FIG. 3 shows an example of a computing system 300 that includes artificial scenario data 302, a latency distribution profile 304, one or more virtual vehicle computing systems 306, a second simulation system 308, and simulation results 310.

The artificial scenario data 302 can include information and/or data associated with one or more artificially generated scenarios. The artificially generated scenarios associated with the artificial scenario data 302 can be based at least in part on any combination of: an artificially generated scenario that is not based on a real-world scenario (e.g., the artificially generated scenario is not based on a real-world scenario including information associated with a physical device and/or an actual event) and/or an artificially generated scenario that is based on a real-world scenario (e.g., the artificially generated scenario is based on a real-world scenario including information associated with a physical device and/or actual event). Further, the artificial scenario data 302 can include information and/or data associated with the simulation and/or emulation of scenarios including scenarios associated with one more computing devices, one or more computing systems, and/or one or more components.

For example, the artificial scenario data 302 can include information and/or data associated with operations performed by a simulated perception system of a simulated autonomous vehicle, including simulated outputs by simulated sensors associated with the simulated perception system.

The artificial scenario data 302 can include information and/or data associated one or more artificially generated scenarios including one or more artificially generated devices (e.g., a simulation of an autonomous vehicle) and or artificially generated events. Further, the artificial scenario data 302 can include: the identity of the one or more artificially generated devices (e.g., identifiers indicating which artificially generated components and systems are being operated); one or more states of the one or more artificially generated devices (e.g., the operational state and performance characteristics of a simulated sensor system; and/or one or more artificially generated external factors that can modify the one or more artificially generated scenarios (e.g., a temperature factor can modify the performance of simulated components).

The latency distribution profile 304 can include information and/or data associated with the latency of simulated systems and/or simulated components simulated by a simulation system (e.g., the first simulation system 208 that is depicted in FIG. 2). The latency distribution profile 304 can include information and/or data associated with a function and/or operation performed by a simulated system or simulated component along with the corresponding latency associated with performing the function and/or operation. The latency distribution profile 304 can include information and/or data associated with a simulation including a simulation of operating software that interacts with a vehicle computing system and is based at least in part on a real-world scenario. In some embodiments, the latency distribution profile 304 can include any of the information and/or data of the latency distribution profile 210 that is depicted in FIG. 2.

The one or more virtual vehicle computing systems 306 can include one or more simulations and/or emulations of computing systems that are configured to operate and/or control one or more vehicle systems or components associated with a vehicle. In some embodiments, the one or more virtual vehicle computing systems 306 can include any of the attributes and/or capabilities of the one or more vehicle computing systems 206 that are depicted in FIG. 2. The one or more virtual vehicle computing systems 306 can send data to and/or receive data from the second simulation system 308. For example, the one or more virtual vehicle computing systems 306 can generate sensor data associated with a simulated sensor system that is part of the one or more virtual vehicle computing systems 306. Further, the one or more virtual vehicle computing systems 306 can then send the sensor data to the second simulation system 308. In some embodiments, copies of one or more portions of information, data, and/or sets of instructions associated with the one or more virtual vehicle computing systems 306 can be implemented, performed, and/or executed by the second simulation system 308.

The second simulation system 308 can include one or more computing systems that are configured to operate, generate, and/or control one or more simulations including simulations associated with the artificial scenario data 302, the latency distribution profile 304, and/or the one or more virtual vehicle computing systems 306. In some embodiments, the second simulation system 308 can perform one or more operations associated with emulating any of the functions and/or operations associated with the artificial scenario data 302, the latency distribution profile 304, and/or the one or more virtual vehicle computing systems 306. Further, the second simulation system 308 can include any of the attributes and/or capabilities of the first simulation system 208 that is depicted in FIG. 2. The second simulation system 308 can be configured to: receive the artificial scenario data 302; receive the latency distribution profile 304; send data to and/or receive data from the one or more virtual vehicle computing systems 306; and/or perform one or more operations including executing sets of instructions based at least in part on one or more portions of information, data, and/or sets of instructions associated with the simulation results 310, the artificial scenario data 302, and/or the one or more virtual vehicle computing systems 306.

In some embodiments, the second simulation system 308 can use information and/or data associated with the artificial scenario data 302, the latency distribution profile 304, and/or the one or more virtual vehicle computing systems 306 simulation results 310 to generate a simulation that includes simulated components with latencies based on the latency of the components included in the latency distribution profile 304. For example, the second simulation system 308 can receive the latency distribution profile 304 that can include the latency of a pedestrian recognition function as well as the sub-functions and components and systems (e.g., a sensor component and a perception system) associated with performance of the pedestrian recognition function. The second simulation system 308 can then generate a simulation, based at least in part on the artificial scenario data 302 and the one or more virtual vehicle computing systems 306, in which the latency of the sensor component and perception system described in the latency distribution profile 304 are simulated in the corresponding virtual sensor component and virtual perception system of the one or more virtual computing systems 306 in a simulated environment described by the artificial scenario data 302.

In some embodiments, the second simulation system 308 can receive the artificial scenario data 302, which includes information and/or data associated with one or more artificial scenarios including a set of operations performed by simulated systems and components of a simulated vehicle operates within the simulated environment described in the artificial scenario data 302. Further, the artificial scenario data 302 can include information and/or data associated with the simulated environment that can be interacted with using the one or more virtual vehicle computing systems 306. The second simulation system 308 can also receive information, data, and/or sets of instructions associated with the one or more virtual vehicle computing systems 306, which can be used to simulate the operation of the virtual vehicle that can include one or more simulated components and/or simulated systems. Using one or more portions of the artificial scenario data 302, the latency distribution profile 304, and/or data associated with the one or more virtual vehicle computing systems 306, the second simulation system 308 can then perform one or more operations to simulate the operation of the vehicle within the simulated environment.

The second simulation system 308 can be configured to collect and/or record information and/or data associated with the simulation including information associated with the timing and/or latency of various systems and/or components that are simulated. In some embodiments, the second simulation system 308 can send information and/or data associated with the simulation to one or more remote computing devices that are configured to communicate with the second simulation system 308. The second simulation system 308 can generate output including the simulation results 310. Further, the simulation results 310 generated by the second simulation system 308 can be based at least in part on the information, data, and/or sets of instructions associated with the artificial scenario data 302, the latency distribution profile 304, and/or the one or more virtual vehicle computing systems 306.

The simulation results 310 can include information associated with the performance of any aspect of the simulation generated by the second simulation system 308 including: the latency and/or latency distribution profile associated with simulated vehicles, simulated systems, and/or simulated components; and/or the performance of simulated vehicles, simulated systems, and/or simulated components. Furthermore, the simulation results 310 can include information and/or data associated with one or more predictions including a predicted behavior of a vehicle, system, and/or component that was simulated by the second simulation system 308. For example, the simulation results 310 can include the predicted behavior of one or more functions and/or operations of a perception system, prediction system, and/or motion planning system of an autonomous vehicle.

FIG. 4 depicts an example latency distribution profile according to example embodiments of the present disclosure. The data and/or information depicted in FIG. 4 can be implemented and/or utilized by one or more devices (e.g., one or more computing devices) and/or systems including, for example, the service entity computing system 104, the vehicle 108, or the vehicle computing system 112, which are depicted in FIG. 1. Further, the one or more devices and/or systems in FIG. 4 can include one or more features of one or more devices and/or systems including, for example, the service entity computing system 104, the vehicle 108, or the vehicle computing system 112, which are depicted in FIG. 1.

As illustrated, FIG. 4 shows a latency distribution profile 400 which can include a function 402, a total latency 404, a camera sub-function 406, a computer-vision sub-function 408, a prediction sub-function 410, and a motion planning sub-function 412.

The latency distribution profile 400 can include information and/or data associated with the latency of systems and/or components including the systems and/or components of an autonomous vehicle. As shown, the latency distribution profile 400 includes the function 402 which is associated with the latency of a stop sign function that is performed by an autonomous vehicle to recognize stop signs in an environment detected by sensors of the autonomous vehicle. As shown, the total latency 404 corresponding to the function 402 is one-hundred and seventy-five milliseconds.

The function 402 can be based at least in part on a plurality of sub-functions (e.g., the camera sub-function 406, the computer-vision sub-function 408, the prediction sub-function 410, and the motion planning sub-function 412), with each sub-function being associated with a respective latency and component. In this example, the total latency 404 represents the combined total latency of the plurality of sub-functions. As shown, the camera sub-function 406 is associated with a camera sensor that is used to detect the environment within its field of view and generate sensor data which can include one or more images of the environment. The latency associated with the camera sub-function 406 can include the latency associated with capturing the image and providing (e.g., sending) the image to a system (e.g., a perception system) associated with the camera sensor. In this example, the latency associated with the camera sub-function 406 is twenty-five milliseconds.

The sensor data generated by the camera sensor associated with the camera sub-function 406 can be used by the computer-vision sub-function 408, which can input the sensor data into a machine-learning model that is configured and/or trained to detect and/or recognize objects (e.g., stop signs) based on inputs including the sensor data. The latency associated with the camera sub-function 406 can include the latency associated with providing the sensor data to the machine-learning model and latency associated with the machine-learning model processing the sensor data in order to determine whether a stop sign has been detected. In this example, the latency associated with the computer-vision sub-function 408 is twenty-five milliseconds.

The computer-vision sub-function 408 can generate data indicating that a stop sign has been detected. The data generated by the computer-vision sub-function 408 can be sent to a prediction system that performs the prediction sub-function 410. The prediction sub-function 410 can perform a set of operations associated with predicting the actions (e.g., future movements) of objects in an environment based at least in part on the data received from the perception system that was generated by the computer-vision sub-function 408. The latency associated with the prediction sub-function 410 can include the latency associated with predicting the future motion of objects in the environment including the stop sign, which is predicted to remain in the same location. In this example, the latency associated with the prediction sub-function 410 is twenty-five milliseconds.

The prediction sub-function 410 can generate data indicating the predicted actions or future states of the objects around the autonomous vehicle. The data generated by the prediction sub-function 410 can be sent to a motion planning system that performs the motion planning sub-function 412. The motion planning sub-function 412 can perform a set of operations associated with controlling an autonomous vehicle based at least in part on the data received from the prediction system that was generated by the prediction sub-function 410. The latency associated with the motion planning sub-function 412 can include the latency associated with generating a motion plan for an autonomous vehicle (e.g., stopping the autonomous vehicle in front of the stop sign), which in this example is a latency of twenty-five milliseconds.

Figure 5:
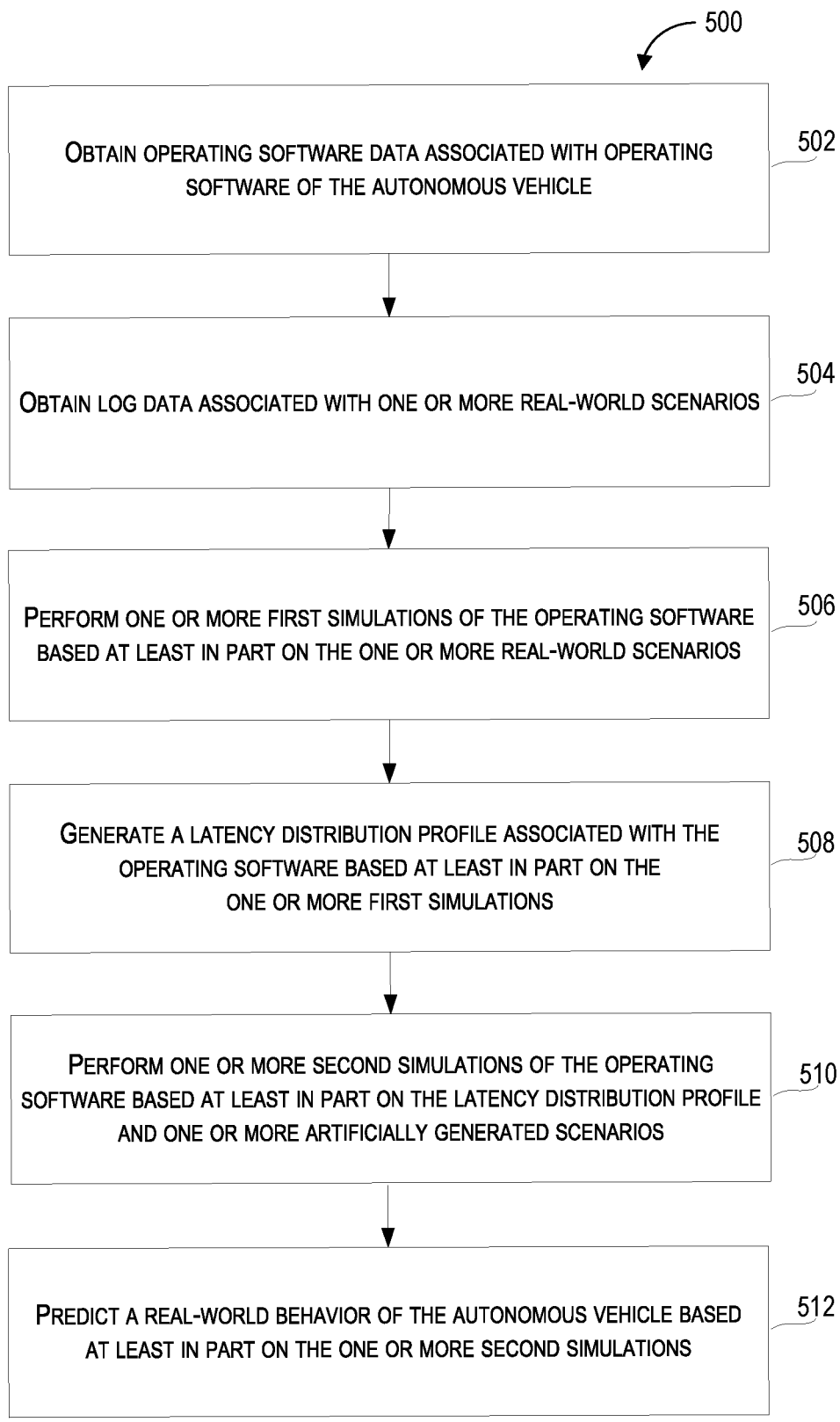
FIG. 5 depicts a flow diagram of an example method of improving a virtual simulation to generate simulation results that better predict a real-world behavior of an autonomous vehicle according to example embodiment of the present disclosure.

FIG. 5 depicts a flow diagram of an example method of improving a virtual simulation to generate simulation results that better predict a real-world behavior of an autonomous vehicle according to example embodiment of the present disclosure. One or more portions of a method 500 can be implemented by one or more devices (e.g., one or more computing devices) or systems including, for example, the service entity computing system 104, the vehicle 108, or the vehicle computing system 112, shown in FIG. 1. Moreover, one or more portions of the method 500 can be implemented as an algorithm on the hardware components of the devices described herein (e.g., as in FIG. 1). FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include obtaining, accessing, and/or retrieving data that can include operating software and/or data associated with and/or representing operating software of an autonomous vehicle. The operating software can include any software associated with a vehicle, vehicle system, and/or vehicle component. Further, the operating software can be used to operate, control, and/or determine the state of: an autonomous device that can include an autonomous vehicle; an autonomy system associated with an autonomous device (e.g., an autonomy system including a perception system, a prediction system, and/or a motion planning system); a communications system used to send and/or receive information; and/or an operating system that is used to operate any other software or application associated with an autonomous device.

By way of example, the service entity computing system 104 can access operating software data that includes information associated with the operating software that is used to operate an autonomy system of an autonomous vehicle.

At 504, the method 500 can include obtaining log data. The log data can include data associated with and/or representing one or more real-world scenarios. The log data can include data and/or information associated with one or more states of one or more systems and/or components at some time in the past. By way of example, the service entity computing system 104 can access log data associated with one or more real-world scenarios including the previously recorded performance of the perception system of an autonomous vehicle as it detects and/or recognizes objects in an environment.

At 506, the method 500 can include performing one or more first simulations of the operating software. The one or more first simulations of the operating software can be based at least in part on the one or more real-world scenarios. In some embodiments, the one or more first simulations of the operating software can be associated with and/or include emulation of the operating software.

By way of example, the service entity computing system 104 can generate and/or implement one or more first simulations in which the operating software of an autonomous vehicle is provided with simulated inputs from a simulated environment. Further, the outputs generated by the operating software can be monitored and/or recorded by one or more computing systems including the service entity computing system 104.

By way of further example, the one or more real-world scenarios can describe an autonomous vehicle travelling through a real-world (e.g., an actual geographical location) environment including a first location and a second location with certain objects in between. The service entity computing system 104 can then use the real-world scenarios to generate the one or more first simulations including a simulated environment based on the real-world scenario as well as a simulation of a perception system of a simulated autonomous vehicle as it detects and recognizes the simulated environment.

At 508, the method 500 can include generating a latency distribution profile associated with and/or representing the operating software. The latency distribution profile associated with the operating software can be based at least in part on the one or more first simulations. Further, the latency distribution profile can include one or more latency values that can be associated with the latency of a function and/or operation performed or implemented on a component and/or system. For example, the latency value for a function or operation (e.g., detecting a cyclist) can represent a latency (e.g., a time in milliseconds) associated with performing the function or operation using the corresponding system or component (e.g., a camera component and/or perception system).

At 510, the method 500 can include performing one or more second simulations of the operating software based at least in part on the latency distribution profile and/or one or more artificially generated scenarios. In some embodiments, the one or more second simulations of the operating software can be associated with and/or include emulation of the operating software.

By way of example, the service entity computing system 104 can generate and/or implement one or more second simulations in which the latency distribution profile is used to adjust parameters associated with simulated systems and/or simulated components of a simulated autonomous vehicle that were generated within the one or more second simulations. Further, the service entity computing system 104 can generate one or more outputs that can be stored and/or provided to one or more remote computing systems.

At 512, the method 500 can include determining a predicted behavior. The predicted behavior can include a predicted behavior of the autonomous vehicle based at least in part on the one or more second simulations which can include the one or more outputs of the one or more second simulations. For example, after generating and/or implementing the one or more second simulations the service entity computing system 104 can generate data associated with the predicted behavior of an autonomous vehicle that was simulated in the one or more second simulations. The data associated with the predicted behavior of the autonomous vehicle can, for example, indicate the predicted latency of various systems of the autonomous vehicle following an update to a new version of the operating software of the autonomous vehicle.

Figure 6:
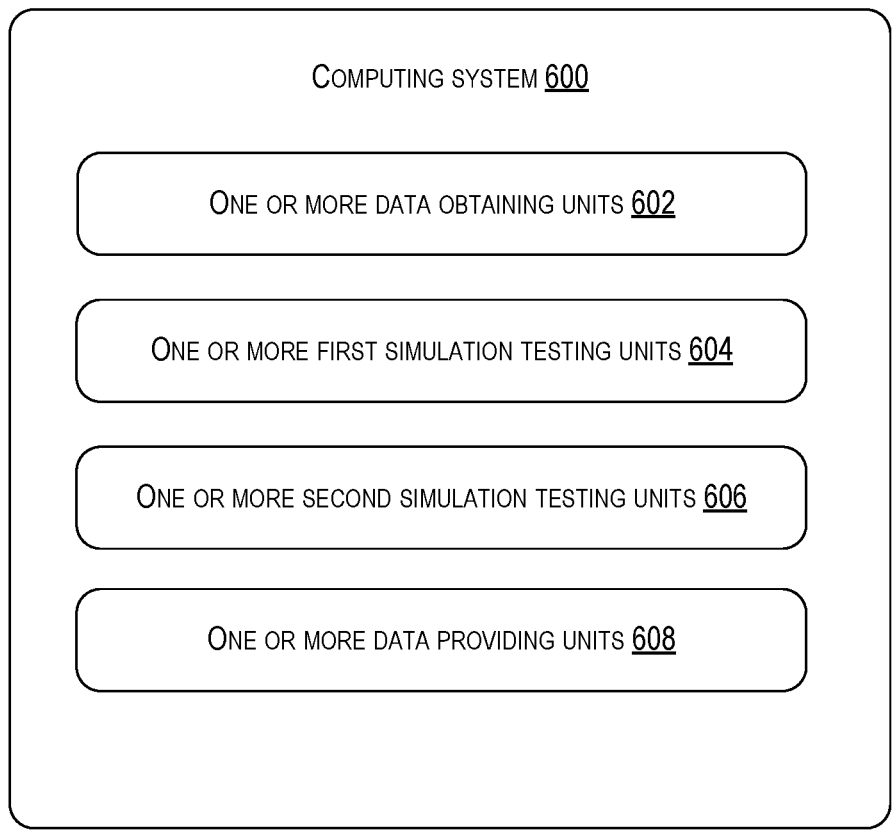
FIG. 6 depicts an example a computing system including means for performing operations according to example embodiments of the present disclosure.

FIG. 6 depicts an example a computing system including means for performing operations according to example embodiments of the present disclosure. One or more operations and/or functions in FIG. 6 can be implemented and/or performed by one or more devices (e.g., one or more computing devices) or systems including, for example, the service entity computing system 104, the vehicle 108, or the vehicle computing system 112, which are shown in FIG. 1. Further, the one or more devices and/or systems in FIG. 6 can include one or more features of one or more devices and/or systems including, for example, the service entity computing system 104, the vehicle 108, or the vehicle computing system 112, which are depicted in FIG. 1.

Various means can be configured to perform the methods and processes described herein. For example, a computing system 600 can include one or more data obtaining units 602, one or more first simulation testing units 604, one or more second simulation testing units 606, one or more data providing units 608, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, including random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to perform the operations described herein) or configured (e.g., an ASIC custom designed and configured to perform the operations described herein) to perform one or more algorithms for performing the operations and functions described herein. For example, the means (e.g., the one or more data obtaining units 602) can be configured to obtain operating software data associated with operating software of an autonomous vehicle. The means (e.g., the one or more data obtaining units 602) can also be configured to obtain log data associated with one or more real-world scenarios. In some implementations, the means (e.g., the one or more data obtaining units 602) can be configured to obtain bench test data associated with one or more latency values associated with one or more components. The one or more data obtaining units 602 are an example of a means for obtaining such data at a service entity computing system as described herein.

The means (e.g., the one or more first simulation testing units 604) can be configured to perform one or more first simulations of the operating software based at least in part on one or more real-world scenarios. For instance, the means (e.g., the first simulation testing units 604) can be configured to initialize a vehicle computing system to an initial state, and execute the operating software on the initialized vehicle computing system. The means (e.g., the one or more first simulation testing units 604) can be configured to perform each first simulation based on a different real-world scenario in the log data to determine a latency value associated with one or more components (e.g., camera latency, computer vision latency, motion planning latency, and/or prediction latency) of the vehicle computing system when the vehicle computing system performs one or more functions (e.g., stop at a stop sign) in response to the real-world scenario. The means (e.g., the one or more first simulation testing units 604) can be configured to generate a latency distribution profile for the operating software based at least in part on the simulation result of each first simulation by aggregating the latency values on a per function and per component basis to determine a distribution of latency values for each component of each of function. In some implementations, the means (e.g., the one or more first simulation testing units 604) can be configured to simulate one or more components of the vehicle computing system when performing the one or more first simulations. In some implementations, the means (e.g., the one or more first simulation testing units 604) can be configured to generate the latency distribution profile based at least in part on the one or more first simulations and the bench test data. The one or more first simulation testing units 604 are an example of a means for performing the one or more first simulations of the operating software.

The means (e.g., the one or more second simulation testing units 606) can be configured to perform one or more second simulations of the operating software based at least in part on the latency distribution profile. For instance, the means (e.g., the one or more second simulation testing units 606) can be configured to initialize a virtual vehicle computing system (e.g., a vehicle computing system emulator), and execute the operating software on the initialized virtual vehicle computing system. The means (e.g., the one or more second simulation testing units 606) can be configured to perform each second simulation based on a different virtual scenario to generate a simulation result. In particular, for each second simulation, the means (e.g., the one or more second simulation testing units 606) can be configured to determine, based on a simulated autonomous vehicle running the operating software, one or more functions that the virtual vehicle computing system performs in response to a virtual scenario; and determine, based on the latency distribution profile, a latency value associated with one or more components of each function. The means (e.g., the one or more second simulation testing units 606) can be configured to aggregate a simulation result of each second simulation to generate simulation results associated with the operating software. In some implementations, the means (e.g., the one or more second simulation testing units 606) can be configured to determine, based on the latency distribution profile, several latency values associated with a component of a function, and generate several corresponding simulation results associated with the simulation (e.g., a simulation result for each of the latency values). The one or more second simulation testing units 606 are an example of a means for performing the one or more second simulations of the operating software.

The means (e.g., the one or more data providing units 608) can be configured to store each simulation result in a structured data format. In some implementations, the means (e.g., the one or more data providing units 608) can be configured to analyze the simulation results in the structured data format to identify patterns, trends, and/or the like between different versions of the operating software based on the corresponding predicted behavior of the autonomous vehicle. In some implementations, the means (e.g., the one or more data providing units 608) can be configured to provide data associated with the simulations, the structured data format, and/or an analysis of the simulation results to one or more remote computing systems. The one or more data providing units 608 are an example of a means for providing such data.

Figure 7:
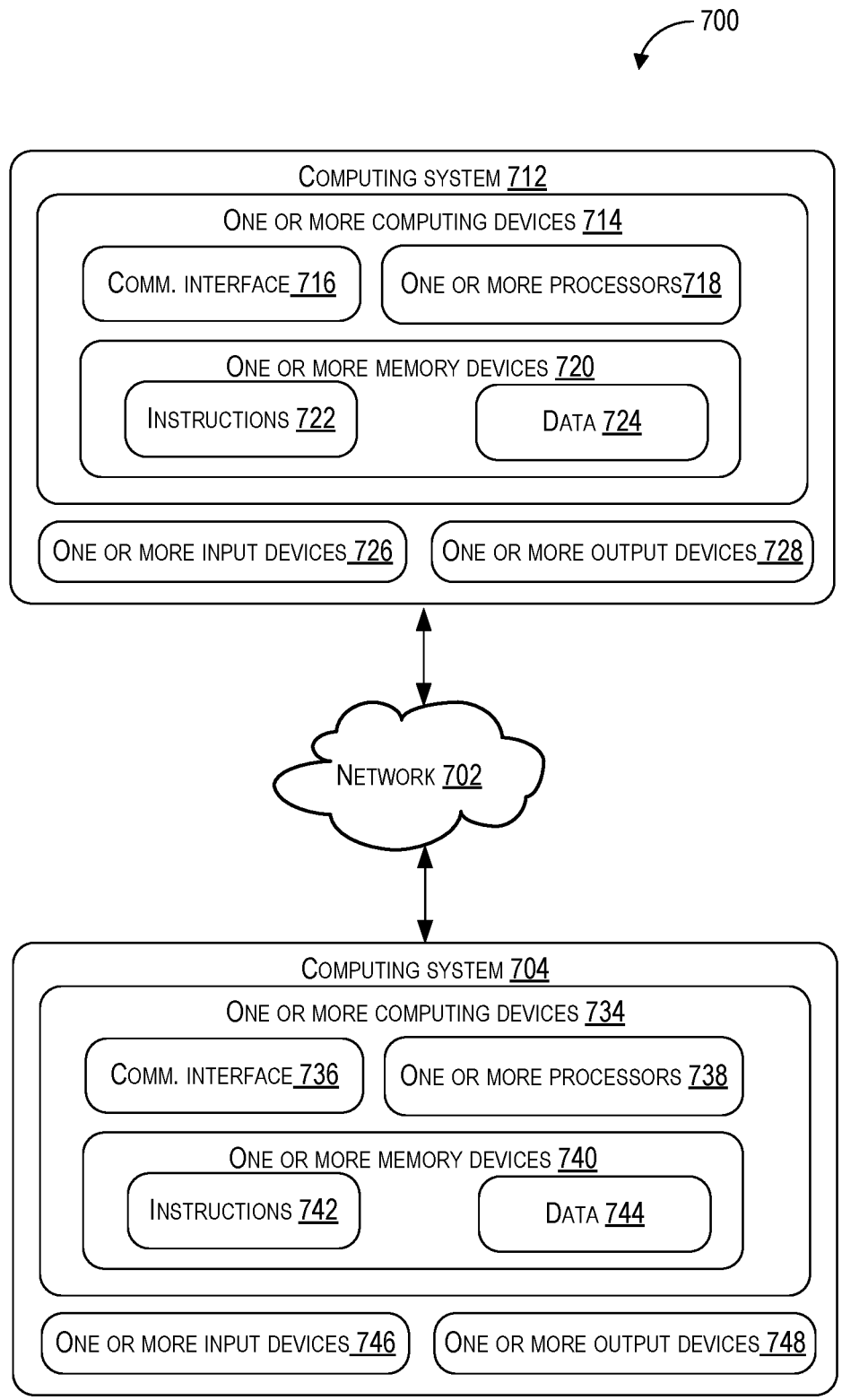
FIG. 7 depicts example system components according to example embodiments of the present disclosure.

FIG. 7 depicts a diagram of an example system according to example embodiments of the present disclosure. A system 700 can include a network 702 which can include one or more features of the communications network 102 depicted in FIG. 1; a computing system 704 which can include any of the attributes and/or capabilities of the service entity computing system 104 depicted in FIG. 1; a computing system 712 which can include any of the attributes and/or capabilities of the vehicle computing system 112 depicted in FIG. 1; one or more computing devices 714; a communication interface 716; one or more processors 718; one or more memory devices 720; computer-readable instructions 722; data 724; one or more input devices 726; one or more output devices 728; one or more computing devices 734; a communication interface 736; one or more processors 738; one or more memory devices 740; computer-readable instructions 742; data 744; one or more input devices 746; and one or more output devices 748.

The computing system 712 can include the one or more computing devices 714. The one or more computing devices 714 can include one or more processors 718 which can be included on-board a vehicle including the vehicle 108 and one or more memory devices 720 which can be included on-board a vehicle including the vehicle 108. The one or more processors 718 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 718 can include a single processor or a plurality of processors that are operatively and/or selectively connected. The one or more memory devices 720 can include one or more non-transitory computer-readable storage media, including RAM, ROM, EEPROM, EPROM, flash memory devices, magnetic disks, and/or combinations thereof.

The one or more memory devices 720 can store data or information that can be accessed by the one or more processors 718. For instance, the one or more memory devices 720 which can be included on-board a vehicle including the vehicle 108, can include computer-readable instructions 722 that can store computer-readable instructions that can be executed by the one or more processors 718. The computer-readable instructions 722 can include software written in any programming language that can be implemented in hardware (e.g., computing hardware). Further, the computer-readable instructions 722 can include instructions that can be executed in logically and/or virtually separate threads on the one or more processors 718. The computer-readable instructions 722 can include any set of instructions that when executed by the one or more processors 718 cause the one or more processors 718 to perform operations.

For example, the one or more memory devices 720 which can be included on-board a vehicle (e.g., the vehicle 108) can store instructions, including specialized instructions, that when executed by the one or more processors 718 on-board the vehicle cause the one or more processors 718 to perform operations including any of the operations and functions of the one or more computing devices 714 or for which the one or more computing devices 714 are configured, including the operations described herein including operating an autonomous device which can include an autonomous vehicle.

The one or more memory devices 720 can include the data 724 that can store data that can be retrieved, manipulated, created, and/or stored by the one or more computing devices 714. The data stored in the data 724 can include, any of the data described herein including any data associated with operation of an autonomous device which can include an autonomous vehicle. For example, the data 724 can include data associated with an autonomy system of an autonomous vehicle including a perception system, a prediction system, and/or a motion planning system.

The data 724 can be stored in one or more databases. The one or more databases can be split up so that the one or more databases are located in multiple locales on-board a vehicle which can include the vehicle 108. In some implementations, the one or more computing devices 714 can obtain data from one or more memory devices that are remote from a vehicle, including, for example the vehicle 108.

The system 700 can include the network 702 (e.g., a communications network) which can be used to send and/or receive signals (e.g., electronic signals) or data (e.g., data from a computing device) including signals or data exchanged between computing devices including the computing system 704, and/or the computing system 712. The network 702 can include any combination of various wired (e.g., twisted pair cable) and/or wireless communication mechanisms (e.g., cellular, wireless, satellite, microwave, and radio frequency) and/or any desired network topology (or topologies). For example, the communications network 702 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 714 can also include the communication interface 716 used to communicate with one or more other systems which can be included on-board a vehicle including the vehicle 108 (e.g., over the network 702). The communication interface 716 can include any suitable components for interfacing with one or more networks, including for example, transmitters, receivers, ports, controllers, antennas, other hardware and/or software.

The computing system 712 can also include one or more input devices 726 and/or one or more output devices 728. The one or more input devices 726 and/or the one or more output devices 728 can be included and/or otherwise associated with a human-machine interface system. The one or more input devices 726 can include, for example, hardware for receiving information from a user, including a touch screen, touch pad, mouse, data entry keys, speakers, and/or a microphone suitable for voice recognition. The one or more output devices 728 can include one or more display devices (e.g., display screen, CRT, and/or LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The computing system 704 can include the one or more computing devices 734. The one or more computing devices 734 can include the communication interface 736, the one or more processors 738, and the one or more memory devices 740. The one or more computing devices 734 can include any of the attributes and/or capabilities of the one or more computing devices 714. The one or more memory devices 740 can store the instructions 742 and/or the data 744 which can include any of the attributes and/or capabilities of the instructions 722 and data 724 respectively.

For example, the one or more memory devices 740 can store instructions, including specialized instructions, that when executed by the one or more processors 738 on-board the vehicle cause the one or more processors 738 to perform operations including any of the operations and functions of the one or more computing devices 734 or for which the one or more computing devices 734 are configured, including the operations described herein including obtaining data (e.g., operating software data, log data, and/or data associated with artificially generated scenarios), implementing or performing one or more simulations, generating one or more latency distribution profiles, and/or predicting a behavior of an autonomous device.

The one or more memory devices 740 can include the data 744 that can store data that can be retrieved, manipulated, created, and/or stored by the one or more computing devices 734. The data stored in the data 744 can include any of the data described herein including the operating software data associated with operating software of the autonomous vehicle, the log data associated with one or more real-world scenarios, data associated with one or more latency distribution profiles, data associated with one or more artificially generated scenarios, the data associated with one or more first simulations, the data associated with one or more second simulations, and/or the data associated with one or more predicted behaviors.

Furthermore, the computing system 704 can include the one or more input devices 746 and/or the one or more output devices 748, which can include any of the attributes and/or capabilities of the one or more input devices 726 and/or the one or more output devices 728.

The computing system 704 can be associated with various types of computing devices. For example, the computing system 704 can be associated with devices including a telephone (e.g., a smart phone), a tablet, a laptop computer, a computerized watch (e.g., a smart watch), computerized eyewear, computerized headwear, and/or other types of computing devices. In some embodiments, the computing system 704 described herein can also be representative of a user device that can be included in the human machine interface system of a vehicle including the vehicle 108.

The technology discussed herein makes reference to computing devices, databases, software applications, and other computer-based systems, as well as actions taken and information sent to and/or from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Data and/or instructions can be implemented on a single system or distributed across multiple systems. Distributed components can operate sequentially or in parallel.

Furthermore, computing tasks discussed herein as being performed at computing devices remote from the vehicle can instead be performed at the vehicle (e.g., via the vehicle computing system). Such configurations can be implemented without deviating from the scope of the present disclosure. The use of computer-based systems allows for a great variety of different possible configurations, combinations, and/or divisions of tasks and functionality between and/or among components. Computer-implemented tasks and/or operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
   obtaining operating software data associated with operating software of an autonomous vehicle;
   obtaining log data associated with one or more real-world scenarios;
   performing one or more first simulations of the operating software based at least in part on the one or more real-world scenarios; and
   generating a latency distribution profile associated with the operating software based at least in part on the one or more first simulations, wherein the latency distribution profile comprises a distribution of one or more latency values associated with one or more components of a vehicle computing system corresponding to the autonomous vehicle.

2. The computer-implemented method of claim 1, wherein the operating software data is indicative of a change log for the operating software of the autonomous vehicle, the change log indicative of a difference between the operating software and a prior version of the operating software.

3. The computer-implemented method of claim 1, wherein the one or more latency values are indicative of an amount of time between a set of signals being sent to a respective component of the one or more components and an action being initiated by the respective component.

4. The computer-implemented method of claim 1, wherein the one or more components of the vehicle computing system comprise one or more hardware devices.

5. The computer-implemented method of claim 1, wherein performing the one or more first simulations of the operating software comprises:
    initializing the vehicle computing system corresponding to the autonomous vehicle to an initial state based at least in part on the operating software; and
    performing the one or more first simulations using the initialized vehicle computing system.

6. The computer-implemented method of claim 1, wherein the operating software data comprises one or more sets of instructions for controlling the one or more components of the vehicle computing system.

7. The computer-implemented method of claim 6, wherein performing the one or more first simulations of the operating software comprises:
    executing the one or more sets of instructions for controlling the one or more components of the vehicle computing system to simulate the performance of an autonomous vehicle function.

8. The computer-implemented method of claim 7, wherein the one or more latency values are indicative of a total latency associated with the performance of the autonomous vehicle function.

9. The computer-implemented method of claim 8, wherein the one or more components of the vehicle computing system are associated with one or more sub-functions of the autonomous vehicle function.

10. The computer-implemented method of claim 9, wherein the one or more latency values are indicative of a component latency associated with the performance of the one or more sub-functions of the autonomous vehicle function.

11. The computer-implemented method of claim 10, wherein the total latency is based on the component latency associated with the performance of the one or more sub-functions of the autonomous vehicle function.

12. The computer-implemented method of claim 1, further comprising:
    obtaining bench test data associated with one or more additional latency values for one or more components that are not included in the vehicle computing system; and
    generating the latency distribution profile based at least in part on the one or more additional latency values.

13. A computing system comprising:
    one or more processors; and
    one or more tangible, non-transitory, computer readable media that store instructions that when executed by the one or more processors cause the computing system to perform operations, the operations comprising:
        obtaining operating software data associated with operating software of an autonomous vehicle;
        obtaining log data associated with one or more real-world scenarios;
        performing one or more first simulations of the operating software based at least in part on the one or more real-world scenarios; and
        generating a latency distribution profile associated with the operating software based at least in part on the one or more first simulations, wherein the latency distribution profile comprises a distribution of one or more latency values associated with one or more components of a vehicle computing system of the autonomous vehicle.

14. The computing system of claim 13, wherein the operating software data comprises one or more sets of instructions for controlling the one or more components of the vehicle computing system.

15. The computing system of claim 14, wherein performing the one or more first simulations of the operating software comprises:
    executing the one or more sets of instructions for controlling the one or more components of the vehicle computing system to simulate the performance of an autonomous vehicle function.

16. The computing system of claim 15, wherein the one or more latency values are indicative of a total latency associated with the performance of the autonomous vehicle function.

17. The computing system of claim 16, wherein the one or more components of the vehicle computing system are associated with one or more sub-functions of the autonomous vehicle function.

18. The computing system of claim 17, wherein the one or more latency values are indicative of a component latency associated with the performance of the one or more sub-functions of the autonomous vehicle function.

19. The computing system of claim 18, wherein the total latency is based on the component latency associated with the performance of the one or more sub-functions of the autonomous vehicle function.

20. A tangible, non-transitory, computer readable media that stores instructions that when executed by one or more processors cause the one or more processors to perform operations, the operations comprising:
    obtaining operating software data associated with operating software of an autonomous vehicle;
    obtaining log data associated with one or more real-world scenarios;
    performing one or more first simulations of the operating software based at least in part on the one or more real-world scenarios; and
    generating a latency distribution profile associated with the operating software based at least in part on the one or more first simulations, wherein the latency distribution profile comprises a distribution of one or more latency values associated with one or more components of a vehicle computing system of the autonomous vehicle.

* * * * *